(12) United States Patent
Yanuzzi et al.

(10) Patent No.: US 7,003,930 B2
(45) Date of Patent: Feb. 28, 2006

(54) BLENDED THERMOFORMABLE RF SEALABLE PLASTIC

(75) Inventors: Keith Yanuzzi, Hazelton, PA (US); Donald R. Hacker, Ripon, WI (US); Michael Bower, Hazelton, PA (US)

(73) Assignee: Kama of Illinois Corporation, Hazleton, PA (US)

( * ) Notice: Subject to any disclaimer, the term of this patent is extended or adjusted under 35 U.S.C. 154(b) by 0 days.

(21) Appl. No.: 11/020,890

(22) Filed: Dec. 22, 2004

(65) Prior Publication Data

US 2005/0097864 A1 May 12, 2005

Related U.S. Application Data

(62) Division of application No. 10/230,607, filed on Aug. 29, 2002, now Pat. No. 6,855,778.

(60) Provisional application No. 60/339,034, filed on Dec. 10, 2001.

(51) Int. Cl.
*B65B 47/00* (2006.01)

(52) U.S. Cl. .......................... 53/453; 53/523; 53/524; 53/525

(58) Field of Classification Search .................. 53/453, 53/523, 524, 525; 525/444
See application file for complete search history.

(56) References Cited

U.S. PATENT DOCUMENTS

| | | | | |
|---|---|---|---|---|
| 4,246,381 A | * | 1/1981 | Robeson | ...................... 525/444 |
| 5,244,091 A | * | 9/1993 | Tannenbaum | ............... 206/462 |
| 5,756,578 A | * | 5/1998 | Hanes | ...................... 525/92 F |
| 5,859,116 A | * | 1/1999 | Shih | .......................... 524/493 |
| 6,401,926 B1 | * | 6/2002 | Lo | ............................. 206/531 |
| 6,599,994 B1 | * | 7/2003 | Shelby et al. | ............... 525/444 |

* cited by examiner

*Primary Examiner*—Scott A. Smith
*Assistant Examiner*—Brian Nash
(74) *Attorney, Agent, or Firm*—Tracey D. Beiriger; H. Eric Fischer; Eckert Seamans Cherin & Mellott, LLC

(57) ABSTRACT

A thermoformable, RF-sealable material for use in packaging. The material is produced from a blend including between approximately 5% and 50% by weight of PETG, and between approximately 50% and 95% by weight of PET. A small amount of color concentrate may be added to the blend. The blend may be extruded into sheets and thermoformed to produce packaging material.

10 Claims, No Drawings

BLENDED THERMOFORMABLE RF SEALABLE PLASTIC

CROSS REFERENCE TO RELATED APPLICATIONS

This application is a divisional of U.S. application Ser. No. 10/230,607, filed on Aug. 29, 2002, now U.S. Pat. No. 6,855,778 which claims the benefit of U.S. Provisional Application Ser. No. 60/339,034, filed on Dec. 10, 2001, now expired the disclosure of which is fully incorporated by reference herein.

BACKGROUND OF THE INVENTION

The present invention relates generally to the field of packaging, and more specifically to a plastic material suitable for manufacturing radio frequency sealable ("RF-sealable") packaging material.

In the packaging industry, traditionally, a "clamshell blister package" refers 10 to a plastic package formed from a pair of layers of thermoformable plastic. An article to be packaged is retained between the layers. Typically, the layers, which may be unitary, are hinged along a common edge and are sealed. Well-known sealing techniques include, for example, heat application, use of chemical adhesives, and radio frequency sealing ("RF-sealing"). An example of a clamshell blister package is disclosed in U.S. Pat. No. 5,788,105, the entirety of which is incorporated herein by reference. Other packages may require sealing besides those having clamshell parts, such as two-piece packages.

In many packaging applications, RF-sealing is the preferred technique to seal the package. The layers for RF-sealable packages are usually composed of polyvinyl chloride (PVC), at least in part because this material is easily RF-sealed. However, the industry in recent times has attempted to move away from the use of PVC packaging material, as it is perceived as less environmentally friendly than other possible materials. For example, the European market has searched for a number of years for an alternative material to PVC, due to Europe's propensity to incinerate waste. One such alternative material is polyethylene terephthalate (PET), a common type of polyester.

However, to seal a blister manufactured from PET plastic, a method other than RF-sealing must generally be used because PET is much less polar than materials that are readily RF-sealed. As such, it has been difficult to provide a thermoformable PET plastic material for packaging due to the inability to effectively RF-seal the material.

Accordingly, there is a need in the art to provide an improved RF-sealable, packaging material that is composed of compounds perceived as more environmentally friendly than PVC.

There is a further need in the art to provide an improved thermoformable packaging material.

There is an additional need in the art to provide a process for manufacturing an RF-sealable material for packaging that provides perceived environmental benefits similar to that of PET, and provides RF-sealing capabilities comparable to PVC.

SUMMARY OF THE INVENTION

These needs and others are met or exceeded by the present RF-sealable packaging material, which provides environmental and other benefits of PET, with sealing benefits comparable to PVC. The present invention further provides a method for forming a blended, thermoformed, RF-sealable package material.

More specifically, one aspect of the present invention provides an RF-sealable, thermoformable plastic material for use in packaging, the material including polyethylene terephthalate (PET) and glycolised polyester (PETG). A color concentrate is optionally provided.

A preferred embodiment of the present invention includes an RF-sealable, thermoformable plastic material including PETG in a weight concentration of between approximately 5% and 50%, and PET in a weight concentration of approximately 50%–95%, plus a small amount of color concentrate.

A further preferred embodiment of the present invention includes an RF-15 sealable plastic packaging material comprising approximately 91% PET by weight and approximately 7% PETG by weight.

An additionally preferred embodiment of the present invention includes an RF-sealable plastic packaging material comprising approximately 91% PET by weight, approximately 7% PETG by weight, and approximately 2% color concentrate by weight.

In a method according to the present invention for forming an RF-sealable, thermoformable package, amounts of polyethylene terephthalate (PET) and glycolised polyester (PETG) are combined, optionally along with a small amount of color concentrate, to form a blend. The blend is extruded to form at least one thermoformable sheet, and the at least one sheet is thermoformable to form at least first and second sections or portions of a package. At least part of the first and second sections or portions is RF-sealed to seal the package. An article optionally may be placed within the package for retention before RF-sealing the first and second sections or portions.

In a preferred method, the blended material includes approximately 91% PET by weight and approximately 7% of PETG by weight. The present method may be further enhanced by adding approximately 2% by weight color concentrate to the blend.

DETAILED DESCRIPTION OF PREFERRED EMBODIMENTS

These needs and others are met or exceeded by the present RF-sealable packaging material, which provides environmental and other benefits of PET, with sealing benefits comparable to PVC. The present invention further provides a method for forming a blended, thermoformed, RF-sealable package material.

More specifically, one aspect of the present invention provides an RF-sealable, thermoformable plastic material for use in packaging, the material including polyethylene terephthalate (PET) and glycolised polyester (PETG). A color concentrate is optionally provided.

A preferred embodiment of the present invention includes an RF-sealable, thermoformable plastic material including PETG in a weight concentration of between approximately 5% and 50%, and PET in a weight concentration of approximately 50%–95%, plus a small amount of color concentrate.

A further preferred embodiment of the present invention includes an RF-15 sealable plastic packaging material comprising approximately 91% PET by weight and approximately 7% PETG by weight.

An additionally preferred embodiment of the present invention includes an RF-sealable plastic packaging material comprising approximately 91% PET by weight, approximately 7% PETG by weight, and approximately 2% color concentrate by weight.

In a method according to the present invention for forming an RF-sealable, thermoformable package, amounts of polyethylene terephthalate (PET) and glycolised polyester (PETG) are combined, optionally along with a small amount of color concentrate, to form a blend. The blend is extruded to form at least one thermoformable sheet, and the at least one sheet is thermoformable to form at least first and second sections or portions of a package. At least part of the first and second sections or portions is RF-sealed to seal the package. An article optionally may be placed within the package for retention before RF-sealing the first and second sections or portions.

In a preferred method, the blended material includes approximately 91% PET by weight and approximately 7% of PETG by weight. The present method may be further enhanced by adding approximately 2% by weight color concentrate to the blend.

Having described the presently preferred embodiments, it is to be understood that the invention may be otherwise embodied within the scope of the appended claims.

What is claimed is:

1. A method of forming a packaging material suitable for use in forming a shaped package, the method comprising the steps of:
    providing a blended material comprising from about 50 weight percent to about 95 weight percent of polyethylene terephthalate (PET), and from about 5 weight percent to about 50 weight percent of glycolised polyester (PETG) to form a blend having an amount of PETG sufficient for the blend to achieve polarity suitable for radio frequency sealing and wherein said PET and PETG constituents of said blended material are selected to provide a blend suitable for thermo-forming a shaped package;
    extruding said blend to form at least one thermoformable sheet; and
    thermoforming said at least one sheet to form the packaging material.

2. The method of claim 1 wherein said step of thermoforming comprises the steps of thermoforming said at least one sheet to form at least first and second sections or portions.

3. The method of claim 2 further comprising the step of: sealing at least a portion of the first and second sections or portions using radio frequency sealing.

4. The method of claim 1 wherein said amount of PETG comprises approximately 7% of said blend by weight.

5. The method of claim 1 further comprising the step of adding approximately 2% by weight of color concentrate to said blend.

6. A method of forming a package comprising:
    (i) thermoforming at least one extruded sheet provided according to the method of claim 5 to form at least first and second sections or portions; and
    (ii) sealing said first and second sections or portions using radio frequency sealing.

7. The method of claim 6 further comprising placing an article between said first and second sections or portions, wherein said step of sealing retains said article within the package.

8. A method of forming a package comprising: thermoforming at least one extruded sheet provided according the method of claim 1 to form at least first and second sections or portions; and
    sealing said first and second sections or portions using radio frequency sealing.

9. The method of claim 8 further comprising the step of placing an article between said first and second sections or portions, wherein said step of sealing retains said article within the package.

10. The method of claim 8 wherein said step of sealing comprises the step of radio frequency sealing along at least one edge of said first and second sections or positions.

* * * * *